(12) United States Patent
Nguyen

(10) Patent No.: US 6,318,296 B1
(45) Date of Patent: Nov. 20, 2001

(54) SMALL ANIMAL FACILITY WITH FIRE EXITS

(76) Inventor: Thinh T. Nguyen, P.O. Box 690863, Houston, TX (US) 77269-0863

(*) Notice: Subject to any disclaimer, the term of this patent is extended or adjusted under 35 U.S.C. 154(b) by 0 days.

(21) Appl. No.: 09/520,098

(22) Filed: Mar. 7, 2000

(51) Int. Cl.[7] ................. A01K 1/00; A01K 1/02; A01K 3/00
(52) U.S. Cl. ................. 119/502; 119/484; 119/501
(58) Field of Search ................. 119/502, 775, 119/484, 622, 501, 524; 340/326, 286.05

(56) References Cited

U.S. PATENT DOCUMENTS 3,969,720 * 7/1976 Nishino ................. 340/326
5,642,092 * 6/1997 Dunne et al. ................. 340/326

* cited by examiner

Primary Examiner—Charles T. Jordan
Assistant Examiner—Judith A. Nelson

(57) ABSTRACT

An animal holding facility with automatic evacuation system is disclosed, comprised of an otherwise conventional kennel. Installed inside of the kennel is an automatic fire/smoke/carbon dioxide detection system utilizing a plurality of smoke and/or fire and/or carbon monoxide sensors. An audible alarm activates upon triggering of the sensors. A common fire door open automatically and a hydraulic animal ejection means gently sweeps or guides the animal out of the kennel through the fire exits. A slide is located at the outside entrance to each fire exit. A cushioned pad is located on the bottom of each slide. A fenced-in area is located at the base of each slide, and is designed to retain the animals in a restricted area away from the fire or smoke or carbon monoxide.

6 Claims, 3 Drawing Sheets

SMALL ANIMAL FACILITY WITH FIRE EXITS

RELATED APPLICATIONS AND DISCLOSURES

The present invention was first disclosed in the Disclosure Document filed on Jun. 14, 1999. There have been no previously filed, nor any co-pending applications, anywhere in the world.

BACKGROUND OF THE INVENTION

1. Field of the Invention

The present invention relates generally to animal holding pens, and, more particularly, to animal holding facility with automatic evacuation system.

2. Description of the Related Art

Keeping pets is a never-ending task, requiring one to constantly feed groom and clean-up after their animal friends. For those that raise, breed or board animals, their responsibilities are compounded many times over. This is especially the case with dealing with a kennel structure. The structure itself provides shelter for the animals from weather, attackers, intruders, and the like. But kennels also increase the risk of death due to fire. Newspapers, television and media are all too often filled with reports of dogs, horses, and other animals that were killed in kennel fires. The animals are unable to escape, thus dying from heat, fear, smoke inhalation and the like. Accordingly, there is a need for a means by which kennels can be provided with a means to automatically and safely evacuate animals from a kennel area in the instance of fire.

In the related art, several devices are disclosed that provide for animal traffic control systems. U.S. Pat. No. 5,651,333, issued in the name of Fisher, discloses a collapsible chute for transporting animals or managing them in the confines of a barn.

U.S. Pat. No. 5,331,923, issued in the name of Mollhagen, describes a portable squeeze chute apparatus and method.

U.S. Pat. No. 5,138,981, issued in the name of Akins, discloses an animal containment pen with a squeeze panel.

U.S. Pat. No. 5,111,773, issued in the name of Akins, describes a squeeze chute apparatus.

U.S. Pat. No. 4,991,543, issued in the name of Silberman, discloses an animal squeezer cage converter.

U.S. Pat. No. 4,513,691, issued in the name of Wood, describes an animal pen with a door and a hydraulic ram to actuate an advancing means that engages the rear of the animal.

A search of the prior art did not disclose any patents that anticipate directly many features of the instant invention. Consequently, a need has been felt for providing an apparatus and method which overcomes the problems cited above.

SUMMARY OF THE INVENTION

It is therefore an object of the present invention to provide an improved animal holding facility with automatic evacuation system that provides for an automatic mechanism to evacuate animals from life threatening situations, such as fire or carbon monoxide, inside of the holding facility.

Briefly described according to one embodiment of the present invention, an animal holding facility with automatic evacuation system is disclosed, comprising a system and method by which a kennel is provided with a means to protect the animal occupants from the dangers of fire and carbon monoxide.

In the event of a fire, an automatic detection system utilizing smoke and/or fire sensors automatically sounds an alarm and opens a common fire door to each kennel area. As a variation for multiple unit kennels, a common wall can comprise this fire door. The door opener also energizes a hydraulic sweep mechanism which gently sweeps or guides the animal out of the kennel through the fire exit.

Once through the door, the animal will fall down a slide to grade level and land upon a cushioned pad. The pad will prevent injury of the animal upon impact. The slide along with the difference in elevation, eliminates the chance of the animal returning to the kennel after it had been removed. The animal will then remain in an outdoor, fenced-in area where it will be contained until the fire is brought under control. The use of the present invention will result in fewer deaths of animals caught in deadly kennel fires.

It is another object of the present invention to provide a means to reduce deaths to animals left unattended in kennels.

It is another object of the present invention to provide a mean to keep the animals away from the burning building after they have escaped, thereby overriding any inclination to return to the place they are being kept.

Other objects of the present invention include providing a device that is strong, durable, and cost effective to produce.

| DESCRIPTIVE KEY |
| --- |
| 10 an animal holding facility with automatic evacuation system |
| 20 animal facility |
| 30 automatic fire/smoke/carbon monoxide detection system |
| 40 sensor |
| 50 alarm |
| 60 fire exit |
| 70 door opening means |
| 80 animal ejection means |
| 85 barrier |
| 90 slide |
| 100 pad |
| 110 fenced-in area |

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
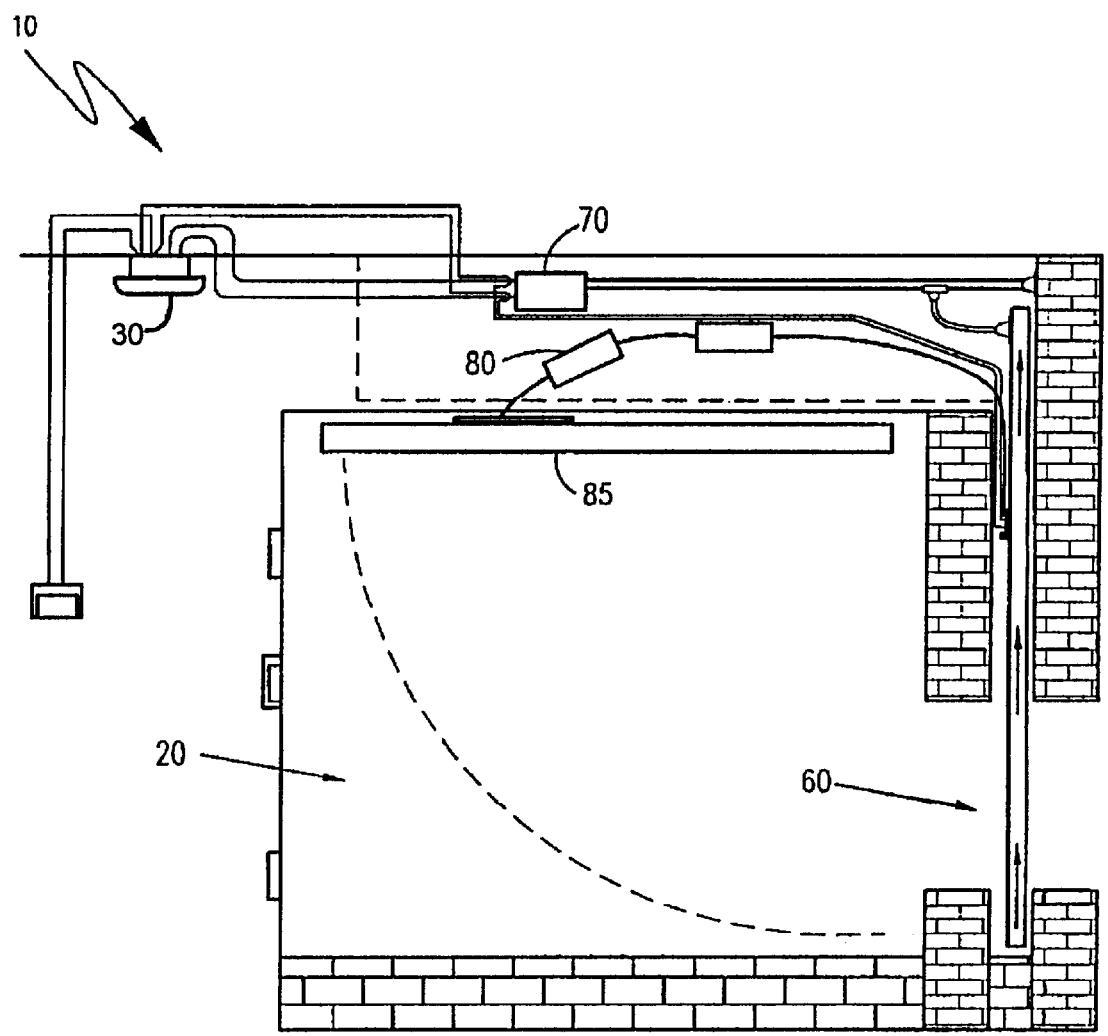
FIG. 1 is a side elevational view of the interior of a kennel area of an animal facility with fire exits incorporating the preferred embodiment of the present invention.
Figure 2:
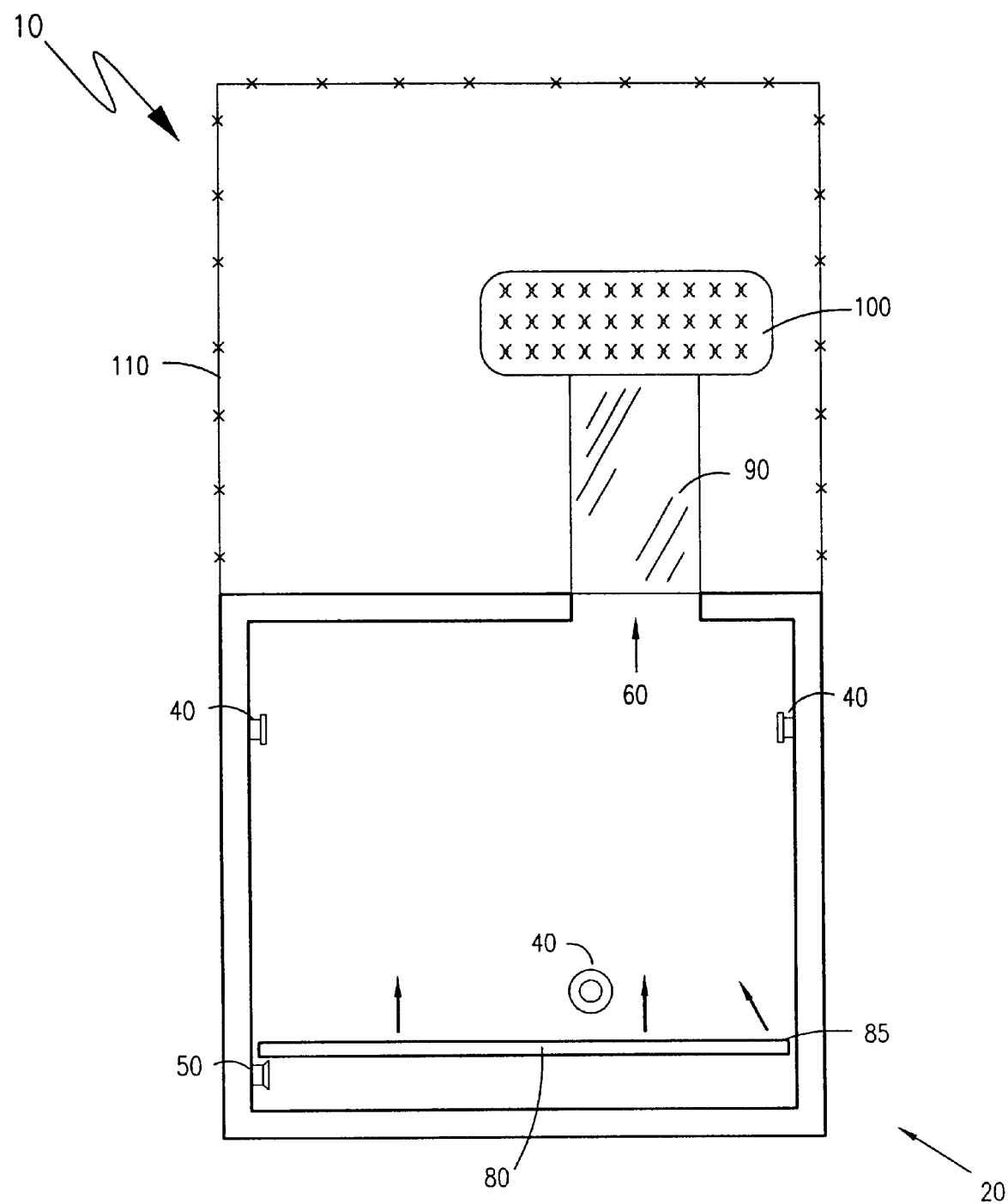
FIG. 2 is a top plan view of the thereof of the front of a kennel area.
Figure 3:
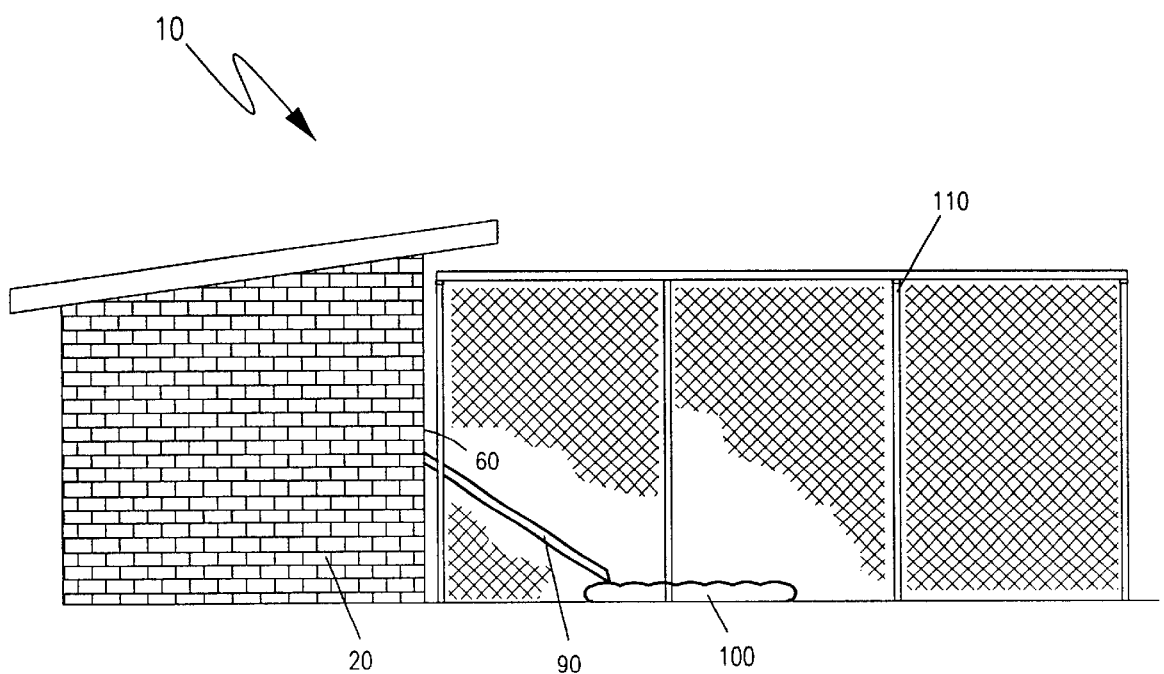
FIG. 3 is a side elevational view of a whole facility of the kennel area.

The best mode for carrying out the invention is presented in terms of its preferred embodiment, herein depicted within the FIGS. 1 through 3.

1. Detailed Description of the Figures

Referring now to FIG. 1, an animal holding facility with automatic evacuation system 10 is shown, according to the present invention, comprises a system and method by which an animal facility 20, such as a kennel, is provided with a means to protect the animal occupants from the dangers of fire, smoke and/or carbon monoxide.

The present invention consists of an otherwise conventional kennel 20. Installed inside of the kennel 20 is an automatic fire/smoke/carbon dioxide detection system 30 utilizing a plurality of smoke and/or fire and/or carbon monoxide sensors 40.

An audible alarm 50 is in electrical connection with the sensors 40. Upon activation of the sensors 40, the audible alarm 50 is activated.

A common fire exit 60 is located in each kennel area. It is envisioned that the fire exit 60 is capable of being slidably retained within a hollow wall located to the rear of the kennel areas. The fire exit 60 has a motorized door opening means 70 that automatically opens the fire exit 60 and keeps the fire exit 60 open, thereby allowing egress from each individual kennel area. The door opening means 70 is in electrical connection with the sensors 40 so that triggering of the sensors 40 triggers the door opening means 70, thereby opening the fire exit 60.

An animal ejection means 80 is hydraulically connected to hydraulic actuation means, which are in communication with the sensors 40, and is activated when one or more of the sensors 40 are triggered. The animal ejection means 80 gently sweeps or guides the animal out of the kennel 20 through the fire exit 60. The animal ejection means 80 acts as a moving barrier that travels the kennel 20 area and herds the animals toward each fire exit 60. The animal ejection means 80 may be of any configuration to accomplish this task and move in a common vertical pattern through each kennel area 20.

For purposes of disclosure, the animal ejection means 80 is depicted as a vertical barrier 85 located at the end of the kennel area 20 opposite the fire exit 60. The barrier 85 is hydraulically articulated, and moves across the kennel area 20 toward the fire exit 60, located next to each other and covering most of the opposite wall.

A slide 90 is located at the outside entrance to each fire exit 60. A cushioned pad 100 is located on the bottom of each slide 90. The slides 90 and pads 100 are designed to allow an animal leaving through each fire door 60 to fall down the slide 90 to grade level and land upon the cushioned pad 100. The slide 90, along with the difference in elevation between the bottom of each slide 90 and corresponding fire exit 60, eliminates the chance of the animal returning to the kennel 20 after it had been removed.

A fenced-in area 110 is located at the base of each slide 90 and is designed to retain the animals in a restricted area away from the fire or smoke or carbon monoxide. The fenced-in area 110 is located at a lower grade than the base of each fire exit 60 to facilitate animal sliding.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

To use the present invention, simply turn the system on. When the sensors 40 are triggered by fire, smoke or carbon monoxide, the audible alarm 50 activates, warning people of a problem. The fire doors 60 open and the animal ejection means 80 is activated, moving the animals out through the fire exits 60, down the slide 90 and into the safe, fenced-in area 110.

The foregoing description is included to illustrate the operation of the preferred embodiment and is not meant to limit the scope of the invention. The scope of the invention is to be limited only by the following claims.

What is claimed is:

1. A small animal facility with fire exits comprising:

a kennel for housing at least one animal; smoke detection means for detecting the presence of smoke; carbon monoxide detection means for detecting the presence of carbon monoxide;

an audible alarm in electrical communication with said smoke detection means and said carbon monoxide detection means; a fire exit for providing emergency egress from said kennel area; a door for securing or releasing said fire exit; door opening means in communication with said smoke detection means and said carbon monoxide means so that annunciation of said audible alarm opens said fire exit; and an animal ejection means for automatically ejecting an occupant of said kennel area through the fire exit upon detection of smoke or carbon monoxide by said smoke detection means or said carbon monoxide means, respectively.

2. The small animal facility with fire exits of claim 1, wherein a plurality of said kennel areas are provided, each said kennel area having an individual fire exit, and all said fire exits secured by a common door.

3. The small animal facility with fire exits of claim 1, wherein said animal ejection means is hydraulically operated.

4. The small animal facility with fire exits of claim 3, wherein said animal ejection means gently sweeps or guides an animal out of said kennel through said fire exit, said animal ejection means further acting as a moving barrier that travels said kennel area and herds the animals toward each fire exit.

5. The small animal facility with fire exits of claim 4, wherein said animal ejection means includes a vertical barrier located at a ceiling of said kennel area, opposite said fire exit, and wherein when said barrier is hydraulically articulated, it moves across said kennel area toward said fire exit.

6. The small animal facility with fire exits of claim 1, further comprising:

a slide located at an outside entrance to each fire exit; and a cushioned pad located at a bottom of each said slide.

* * * * *